United States Patent [19]

Pegg

[11] Patent Number: 5,163,097
[45] Date of Patent: Nov. 10, 1992

[54] METHOD AND APPARATUS FOR PROVIDING SECURE ACCESS TO A LIMITED ACCESS SYSTEM

[75] Inventor: Tina C. Pegg, Jackson, Fla.

[73] Assignee: DynamicServe, Ltd., Tinley Park, Ill.

[21] Appl. No.: 741,705

[22] Filed: Aug. 7, 1991

[51] Int. Cl.$^5$ ............................................. H04R 1/00
[52] U.S. Cl. .......................................... 380/21; 380/23; 380/24; 380/25; 380/44
[58] Field of Search .................. 380/21, 28, 44, 23–25

[56] References Cited

U.S. PATENT DOCUMENTS

| | | | |
|---|---|---|---|
| 4,023,012 | 5/1977 | Ano et al. | |
| 4,236,068 | 11/1980 | Walton | |
| 4,484,025 | 11/1984 | Ostermann et al. | 380/28 |
| 4,528,442 | 9/1985 | Endo | |
| 4,691,355 | 9/1987 | Wirstrom et al. | 380/23 |
| 4,720,860 | 1/1988 | Weiss | 380/23 |
| 4,733,345 | 3/1988 | Anderson et al. | 380/25 |
| 4,819,267 | 4/1989 | Cargile et al. | 380/23 |
| 4,856,062 | 8/1989 | Weiss | 380/23 |
| 4,885,778 | 12/1989 | Weiss | 380/23 |
| 4,980,679 | 12/1990 | Klaubert | |
| 4,992,783 | 2/1991 | Zdunek et al. | |
| 4,998,279 | 3/1991 | Weiss | 380/23 |

Primary Examiner—Salvatore Cangialosi
Attorney, Agent, or Firm—Welsh & Katz, Ltd.

[57] ABSTRACT

Disclosed is a method and apparatus that protects user passwords and identification numbers by using dynamic and fixed cipher keys to generate one-time access codes that are recognized by an authorization center. The authorization center provides a user with a pool of user selectable algorithms that are easily remembered by a user. When access is desired the user mentally generates and subsequently enters a non-machine generated access code formed by using the selected algorithm, the password, and a dynamic variable. The authorization center also generates a corresponding access code using stored user data. If the two access codes match access is granted.

12 Claims, 7 Drawing Sheets

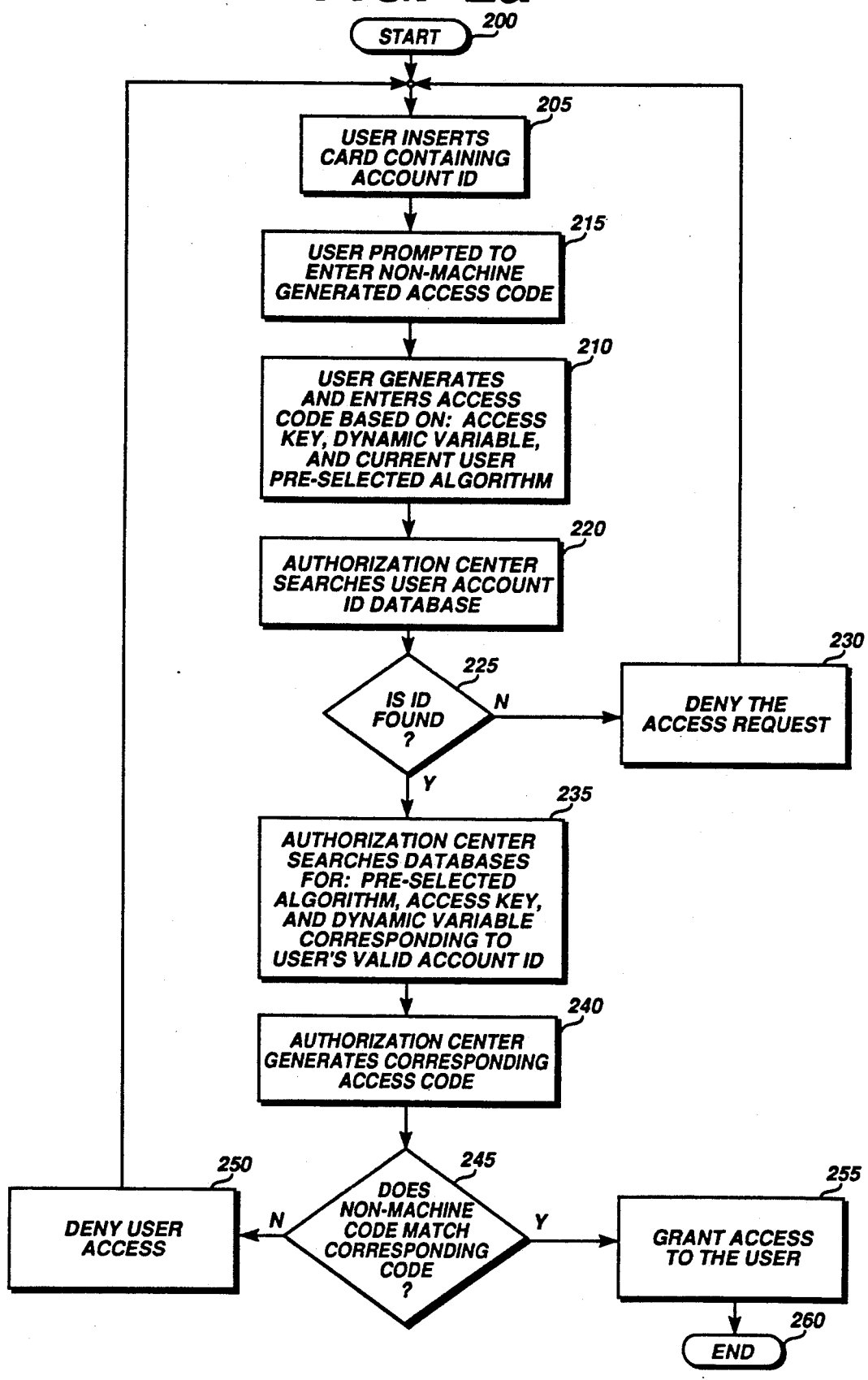

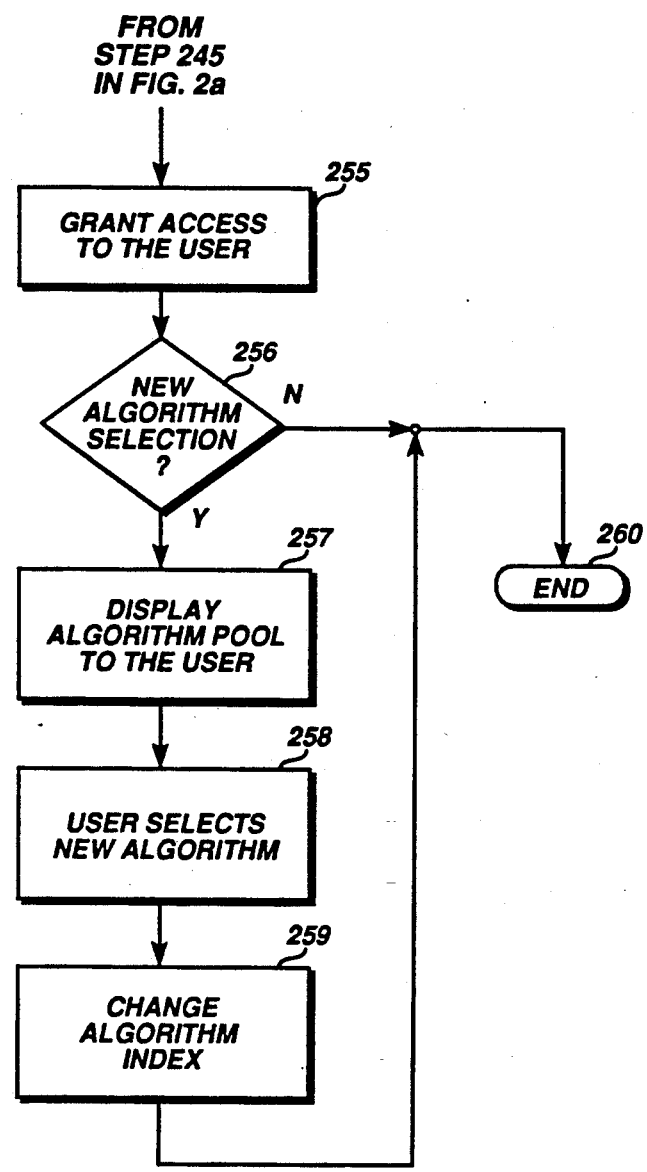

METHOD AND APPARATUS FOR PROVIDING SECURE ACCESS TO A LIMITED ACCESS SYSTEM

FIELD OF THE INVENTION

This invention generally pertains to the field of system access security and more particularly to a method and apparatus for protecting user access information.

BACKGROUND OF THE INVENTION

Theft or misappropriation of personal access numbers, passwords, or personal identification numbers (PIN's) often occurs where businesses provide a user (or customer) with remote access to a service or product. In the case of financial services, the password is a PIN. For example, a bank issues a PIN and an account number for use in accessing a plurality of cash disbursement machines (e.g. Automatic Teller Machines—ATM's). Cash disbursement machines are typically linked to a central computer that performs the access authorization process.

Generally, access authorization occurs by inserting a card containing a magnetically stored account number or other user account information into the remote ATM. Once the magnetic card reader in the ATM reads and matches the stored account number with a valid account number, the ATM prompts the user to input the user's PIN. If the entered PIN and account number pair correspond to a valid PIN and account number pair previously stored in a user file, access to the account is granted. The unique PIN assigned to or chosen by the user is typically memorized by the user and is not known to any other entity other than an account access administrator that issues the PIN.

Generally, theft occurs because the PIN is a static or fixed identification key in that the user enters the same identification key (i.e., PIN) each time access is desired. An unscrupulous onlooker may see the PIN being entered (or a password as in the case of a computer terminal, mobile telephone, or equivalent access terminals) and may steal the card whereafter the thief may gain access to the system. Alternatively, as in the case of a telephone calling card, the card is not required to access the account.

One known method for protecting card users allows the user to choose a PIN without the knowledge of the account access administrator. This further reduces the number of persons that know the user's PIN. Such methods also use an encoding algorithm to encode the PIN and subsequently store the encoded version of the PIN on the card. The encoding algorithm is known only to the account access administrator and uses both static and dynamic encoding keys as variables to generate an encoded PIN. A dynamic variable changes as a function of an event or environmental situation which may include a new account balance or the date of the use of the card. Consequently the encoded PIN is more random and less predictable.

However, the user still enters the undisguised static PIN whereafter the system decodes the encoded PIN stored on the card and grants access to the system if the decoded PIN and the undisguised static PIN match. Therefore the problem of an unscrupulous onlooker gaining access to the system from seeing the PIN and stealing the card still exists.

Other access methods require additional hardware components and also include the use of time dependent variables (time of day data), as encoding keys for a predetermined algorithm. Generally in such a system, both the user and an authorization center (e.g. ATM) use a separate computer to generate a "non-predictable code" based on a predetermined ciphering algorithm. This algorithm is stored in both computers.

The PIN and account number are entered by the user into the hand held computer that stores the predetermined algorithm (the same algorithm used by the verification computer). The algorithm obtains the time dependent variable from its internal clock and generates the "non-predictable" code that is then entered into the ATM by the user. Each computer requires an internal clock to generate the dynamic time dependent variable. The user receives ultimate access when a match between the two generated codes occurs. The algorithm uses a plurality of static variables and a dynamic time dependent variable as its ciphering keys.

However, this method requires a user to obtain a separate computer to access a desired system and requires each of the separate computers to maintain timing devices for time dependent variable generation and synchronization. This becomes costly and complicated when users require inexpensive and easy access to a desired service or product.

There exists a need for a secure access method and system that substantially prevents an onlooker from determining secret access data while minimizing the hardware and access time needed by the user to receive complete access to a limited access system.

SUMMARY OF THE INVENTION

These needs and others have been substantially met through the method and apparatus for providing secure access to a limited access system as described herein. The invention includes a method of securing access to a limited access system including the steps of: maintaining a plurality of user selectable ciphering algorithms that are accessible by an authorization means, such as an authorization center; selecting, by the user, one of the plurality of user selectable ciphering algorithms as an access ciphering method; inputting, by the user, a non-machine generated access code based on the selected ciphering algorithm and further including at least one dynamic variable as a first cipher key, such as the current Dow Jones Industrial Average and one or more fixed variables as a second cipher key, such as a PIN. Alternatively, a dynamic variable only may be used, for example, with a telephone calling card the dynamic algorithm may be use of the last for digits of the called telephone number. The method also requires: generating, for use by the authorization means, a corresponding access code also based on the selected ciphering algorithm and also including at least one dynamic variable as a first cipher key and one fixed variable as a second cipher key; comparing the non-machine generated access code with the corresponding access code; and granting the user access to the limited access system in response to an output resulting from the comparison of the non-machine generated access code and the corresponding access code.

A method for using a keypad with numerical keys as an alphabetical and/or non-numerical (e.g., "*", "#", etc.) character generator for entry of the non-machine generated access code is also disclosed. This method includes entering a sequence of keys along with a delimiter key to represent non-numerical characters such as alphabetical characters.

n apparatus is disclosed that includes: an authorization center coupled to an access code entry means (e.g., telephone dial, ISDN phone keypad, ATM keypad, a dual tone multiple frequency keypad, touch or scribe sensitive screen, speech recognition device, etc.). The authorization center includes means for storing a plurality of user selectable ciphering algorithms and computing means, operably coupled to the means for storing, for generating a corresponding access code based on a user selected ciphering algorithm chosen from the plurality of user selectable ciphering algorithms. The corresponding access code includes at least: one or more dynamic variables as a first cipher key; and may include one or more fixed variables as a second cipher key.

The authorization center has means, operably coupled to the computing means, for comparing a non-machine generated access code with the corresponding access code and means, operably coupled to the computing means, for granting the user access to the limited access system in response to an output resulting from the comparison of the non-machine generated access code and the corresponding access code.

The code entry means is operably coupled to the authorization center and enables the user to input a non-machine generated access code for verification. The access code is based on the selected ciphering algorithm, and at least: one dynamic variable as a first cipher key; and optionally, at least one fixed variable as a second cipher key. The authorization system compares the two generated access codes and grants access if there is a match.

BRIEF DESCRIPTION OF THE DRAWINGS

The features of the present invention which are believed to be novel are set forth below with particularity in the appended claims. The invention, together with further objects and advantages thereof, may be understood by reference to the following description taken in conjunction with the accompanying drawings.

FIG. 2a is a flow chart depicting the preferred embodiment for the method of providing secure access to a limited access system in accordance with the invention;

FIG. 2b is a flow chart depicting another embodiment of the method in FIG. 2a;

DETAILED DESCRIPTION OF THE INVENTION

Figure 1:
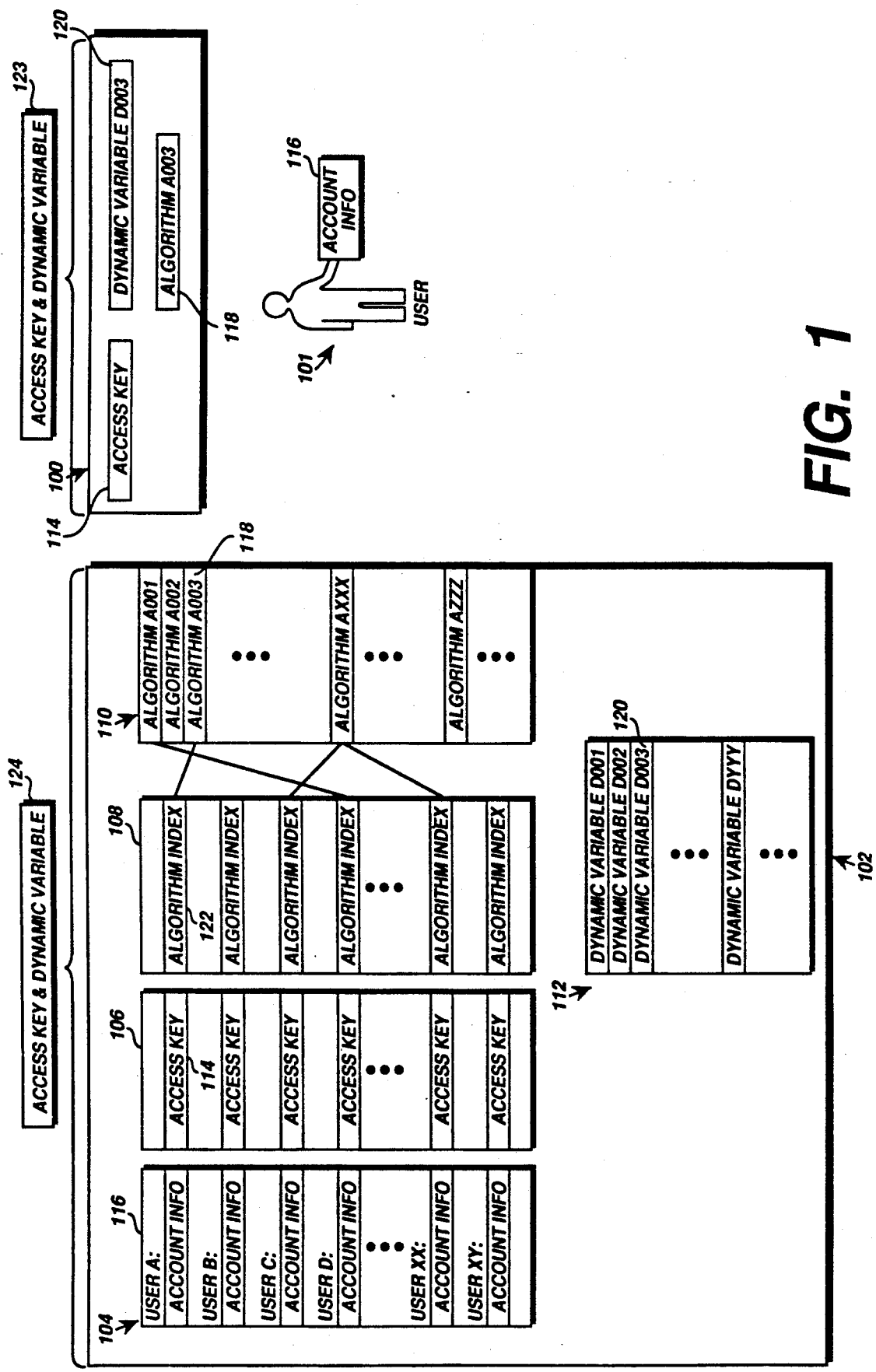
FIG. 1 is a diagrammatic representation of the cipher keys and information format employed by a user and a verification system in accordance with the invention.

FIG. 1 shows cipher elements 100 employed by a user 101 and cipher elements 102 employed by an authorization center. Cipher elements 102 for the authorization center include a plurality of: user account information 104 such as account ID's, user access keys 106; user algorithm index numbers 108; user selectable cipher algorithms 110; and dynamic variables 112. These elements are stored in memory in the authorization center. The authorization center is typically one or more computing site(s) with storage capabilities and will be discussed later with reference to FIG. 3.

Cipher information employed by the user 101 includes: a unique access key 114 memorized by the user, such as a PIN; an account I.D. 116 such as bank account number or phone number, typically stored on a card; a selected cipher algorithm 118 memorized by the user and selected from the pool of algorithms 110; and one or more dynamic variables 120.

An account access administrator assigns each user a static account ID 116 and a static access key 114 which uniquely identifies the user to an appropriate access system. This information is stored and is accessible by the authorization center. The user preselects one of the cipher algorithms 118 from the pool of selectable cipher algorithms 110 when the access key is first assigned to the user. The algorithm 110 may be changed by the user by selecting another one of the algorithms 110 at a time after the initial selection. An algorithm index 122 serves as a pointer indicating the selected algorithm 118 from the pool 110.

Each cipher algorithm in the pool 110 is different and is selectable by more than one user as indicated by user C and user XX each choosing algorithm AXXX. Each cipher algorithm requires that at least a user's access key and one or more dynamic variables serve as cipher keys to generate an output.

The output from the cipher process is called an access code. This access code may be a multiple alternative code, for example, for a calling card, the access code could be either the first or last four digits of the called telephone number. The access code generated by the user 101 is a non-machine generated access code 123 because it is generated from memory by the user without the necessity of a separate computer. The access code generated by the authorization center is called a corresponding access code 124. Typically, an access code constitutes a four to eight character code (e.g., 12300A); although many access code types and lengths are suitable.

The pool of cipher algorithms 110 includes a list of simple yet effective coding schemes to generate dynamic access codes that substantially disguise the user's access key from onlookers by resulting in an access code which continually changes. In the illustrated embodiment, the dynamic variable is preferably an environmental dependent variable. Examples of these cipher algorithms include: using an ATM's serial number as the environmental dynamic variable (it changes at each ATM) in conjunction with the access key to generate the access code; using the latest Dow Jones Industrial Average (DJIA) as the dynamic variable in conjunction with the access key to generate the access code; or in the case of telephone access, using the dialed number as the dynamic variable along with the access key to generate the access code. The exact coding sequence (i.e., algorithm) using these variables may vary, therefore any suitable scrambling techniques to disguise the access key using the dynamic variable may be used. The algorithm may be as simple as adding the ATM serial number to the access key. A user may also design a customized algorithm and have the authorization center store it in the algorithm pool 110.

Using the dynamic variable to generate the access code creates a dynamic password system by causing the access code to vary with each use. After the user 101 and the authorization center generate access codes 123, 124, they are compared to determine whether a match exists. A match indicates a valid access code.

Like current systems, each access key may be unique. Using unique access keys 106 allows multiple users to choose the same algorithm without jeopardizing security. For example, when two users choose an algorithm that requires entry of the serial number of an ATM as the dynamic variable, two users on that same ATM will produce two different access codes since their static access keys are different.

FIG. 2a shows the preferred embodiment of the steps between a user and an authorization center for providing secure access to systems. The authorization center begins the process in step 200 by asking a user to insert a card, or alternatively, to simply enter an ID (the card or ID may contain the user's account I.D.), into a reader. The user inserts the card in step 205. Once the card is inserted, the authorization center prompts the user in step 215 to enter the non-machine generated access code 123. In step 210, the user then generates the non-machine generated access code using the selected cipher algorithm 118, the user's memorized access key 114, and one or more dynamic variables 120. Also in step 210, the user enters the non-machine generated access code via a keypad or other input device into the access system.

In step 220, the authorization center scans its user account ID database network 104 to verify that the entered account ID 116 is valid. Next the authorization center determines whether the account ID 116 is found as indicated by step 225. If the account ID 116 is not found in the database, access is denied and the system asks the user to reinsert the card as depicted by step 230 and the path going back to step 205.

If the account ID 116 is found, the authorization center continues to step 235 where the valid account ID is used to locate the users corresponding data file containing the proper selected cipher algorithm index 122 and the user's access key 114. Based on this data, the authorization center searches a dynamic variable database 112 for the proper dynamic variable associated with the selected algorithm. The authorization center then proceeds to step 240 where it generates a corresponding access code 124 based on the above mentioned stored data.

In step 245, the authorization center compares the non-machine generated access code 123 entered by the user with the corresponding access code 124 generated by the authorization center. If no match occurs, the authorization center proceeds to step 250 whereafter the authorization center denies access and continues back to step 205. If a match is detected, the authorization center acknowledges access by a proper user and continues to step 255 whereafter access grants to the user. Once the authorization center grants access, the access procedure is terminated as indicated by step 260. The user then continues with the desired transactions.

As is obvious to those of ordinary skill in the art, variations on the order of the above steps may be advantageous to a given application, such as the moving of steps 225 and 230 immediately after step 205, without departing from the spirit and scope of the invention.

FIG. 2b depicts another embodiment of the process in FIG. 2a and provides the user with additional security by allowing the user the option of selecting a new cipher algorithm from the cipher algorithm pool after each transaction. Therefore, if an onlooker does see the non-machine generated access code 123 entered by the user at the beginning of the transaction, access for that same access code on the same machine thereafter will be denied because the next access code now requires use of the newly selected cipher algorithm.

This aspect is shown by steps 256-259. After the authorization center gives access in step 255 but before the access procedure is completed (step 260), the authorization center asks the user if a new algorithm should be selected from the pool as shown in step 256. If no new algorithm is desired, the access process is ended at step 260. If the user desires a new algorithm from the pool the access process continues to step 257 where the pool of cipher algorithm is displayed to the user for selection. In step 258, the user selects a new algorithm. After a new algorithm gets selected, the authorization center updates the algorithm index in the user information file to reflect the change in algorithms as shown in step 259. The access process again ends at step 260 whereafter the user continues with a desired transaction.

Figure 3:
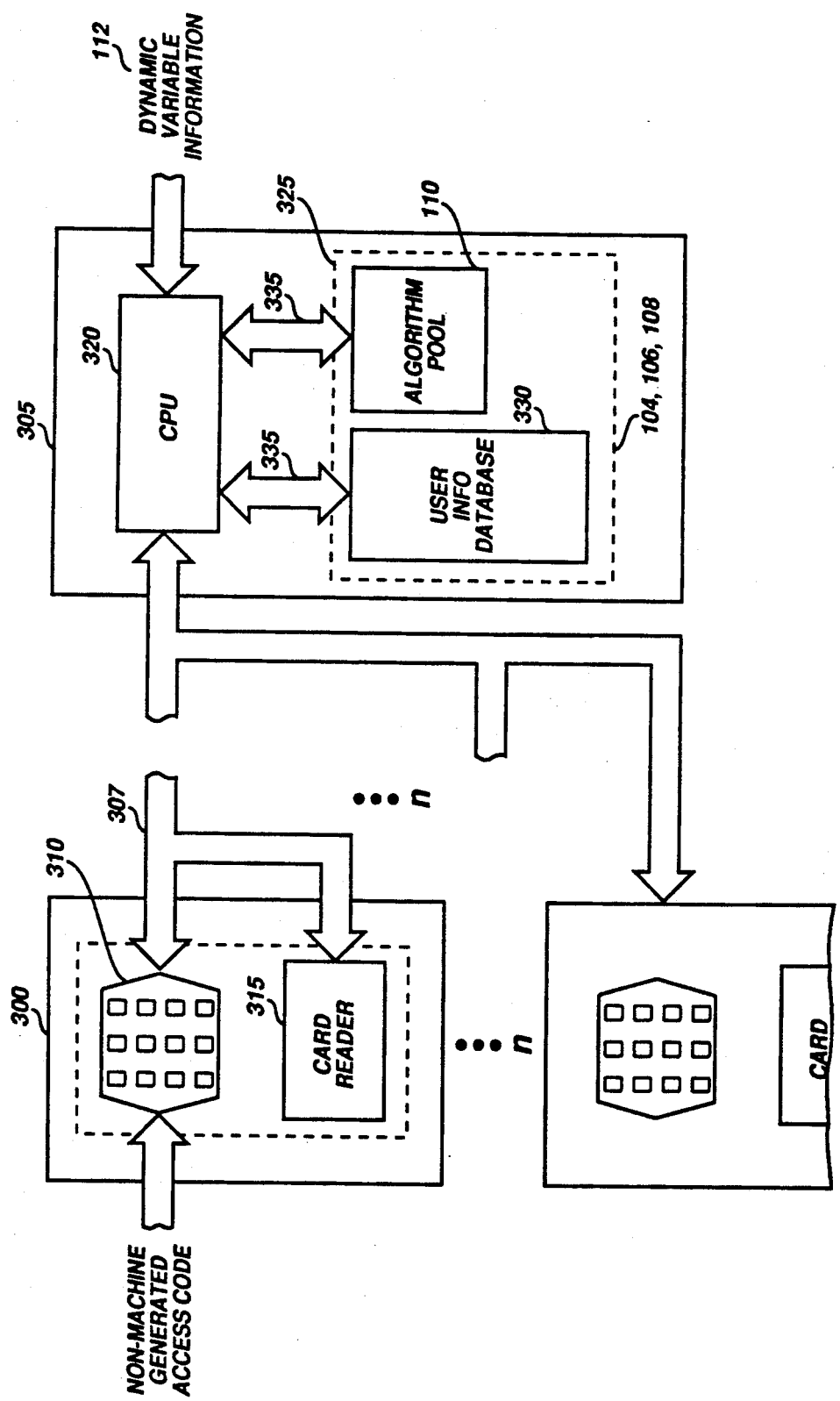
FIG. 3 is a functional block diagram of an apparatus for providing secure access to a limited access system in accordance with the invention.

FIG. 3 shows a block diagram of a system for providing secure access to a limited access system. The system includes an access code entry system 300 and an access authorization center 305.

The access code entry system 300 includes a code input apparatus 310 such as a dual tone multiple frequency (DTMF) keypad for inputting the access code 123 and/or account ID 116 and for selecting the desired algorithm. It also may include a card reading device 315 for reading information magnetically or optically stored on a storage medium such as a card. The authorization center 305 includes a computing unit 320, such as a mainframe or personal computer containing a CPU and storage means 325. The storage means is non-volatile or volatile memory structured as databases.

The access code entry system 300 is coupled to the access authorization center 305 through a communication link 307 such as an optical link, computer bus, or telephone line. The code entry system 310 and the card reading device 315 are coupled to the computing means also through communication link 307. The computing means 320 is coupled to the storage means 325 through computer bus 335.

The computing unit 320 performs the ciphering function, comparison function, and the granting function when determining whether access should be granted (as described in steps 215-260 of FIG. 2a and FIG. 2b). A first portion of the storage means 325 is capable of accessing user information 330 that includes the user's account ID 116, the user access key 114, and the algorithm index 122 (as described with reference to FIG. 1). The storage means 325 also stores the pool of user selectable cipher algorithms 110. The storage means 325 may be storage devices at multiple locations accessible by the computing unit 320. Dynamic variable data 112 may be stored in a database or some other available source which is accessible by the computing unit 320.

The access code entry system 300 and the authorization center 305 may be integrated into the same housing or may be separate components. Furthermore, more than one code entry system 300 may be connected with one or more access authorization centers 305. In addition to at least one processing unit being shared between an access code entry system 300 and an authorization center 305, the code entry system 300 may have its own dedicated processing unit. Any other suitable network structure may also be used.

Figure 4:
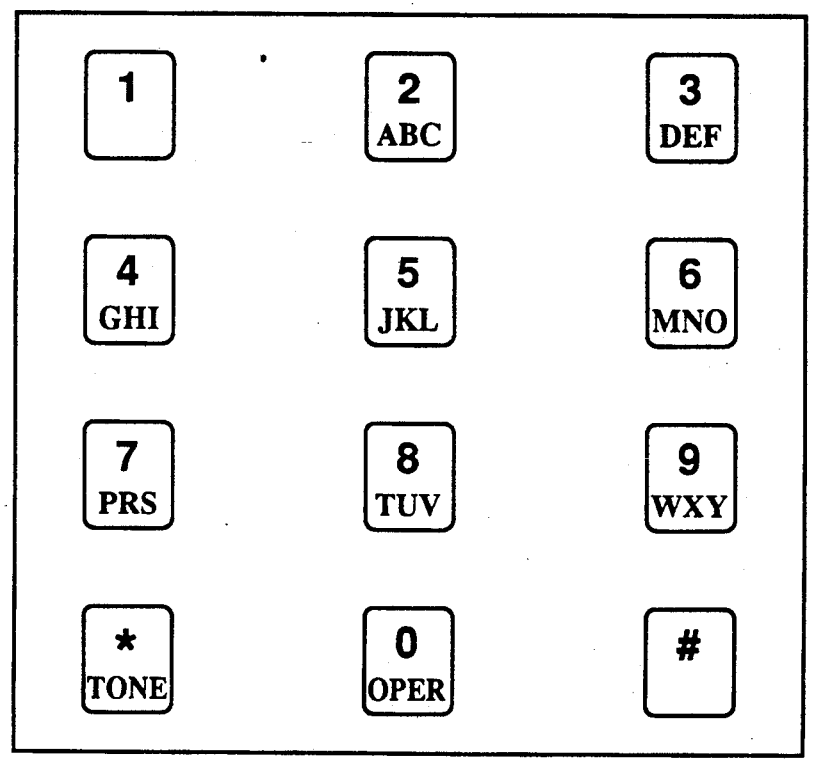
FIG. 4 is a pictorial representation of a typical dual tone multiple frequency keypad as used in the embodiment of FIG. 3.

FIG. 4 depicts the layout of a typical DTMF keypad, which is an example of a keypad with numerical keys. Typically access entry systems utilizing such a device only use access codes that correspond to a numerical representation based on combinations of the single digit numbers 0-9 shown on the face of the keypad. This invention discloses a method for representing non-numerical characters using the numerical based keypad. This affords the user additional flexibility in choosing the type of dynamic variable for use with an algorithm.

One user may be more apt to remembering words while another user may more easily remember numbers. Consequently, a user may want to use a number as the dynamic variable such as the current DJIA or may prefer to use words from a daily newspaper such as the first word used in a favorite writer's column. The user may use the numeric keypad to represent both numbers and/or letters.

The inventive method includes entering a combination of at least one key from the keypad; entering another key from the keypad as a delimiter key; and determining whether the combination of at least two keys, including the delimiter key represents a non-numerical character (e.g., "#101" or "#103="+"). The delimiter key may be at any point in the character string (for example, at the end, "51*"=J; at the beginning, "*51"=J; and in the middle, "5*1"=J). In another option, a single key may be used more than once (e.g., "##"="#").

As an example, when the "*" key is used as the end delimiter character, the letters "J", "K", and "L" may be input by the user as "51*", "52*", and "53*" respectively. When, for example, the leading delimiter method is used and the "#" character is the delimiter key, the letters "F", "J", "K", and "L" are input by the user as "#33", "#51", "#52", and "#53" respectively. As another example, the letters "J", "K", and "L" may also be represented as "*501", "*502", and "*503" depending on the desired convention.

Using the above leading delimiter format wherein the "#" is the delimiter and a space is represented by "#99", a key stream "#33#53#99456888" will be decoded by the access system as a license plate number "FL 456888". Although this method is employed in an access authorization system, it would be obvious to those skilled in the art to employ this method in other applications which would also benefit from alphabetical character recognition when using a numerical key entry means.

Figure 5:
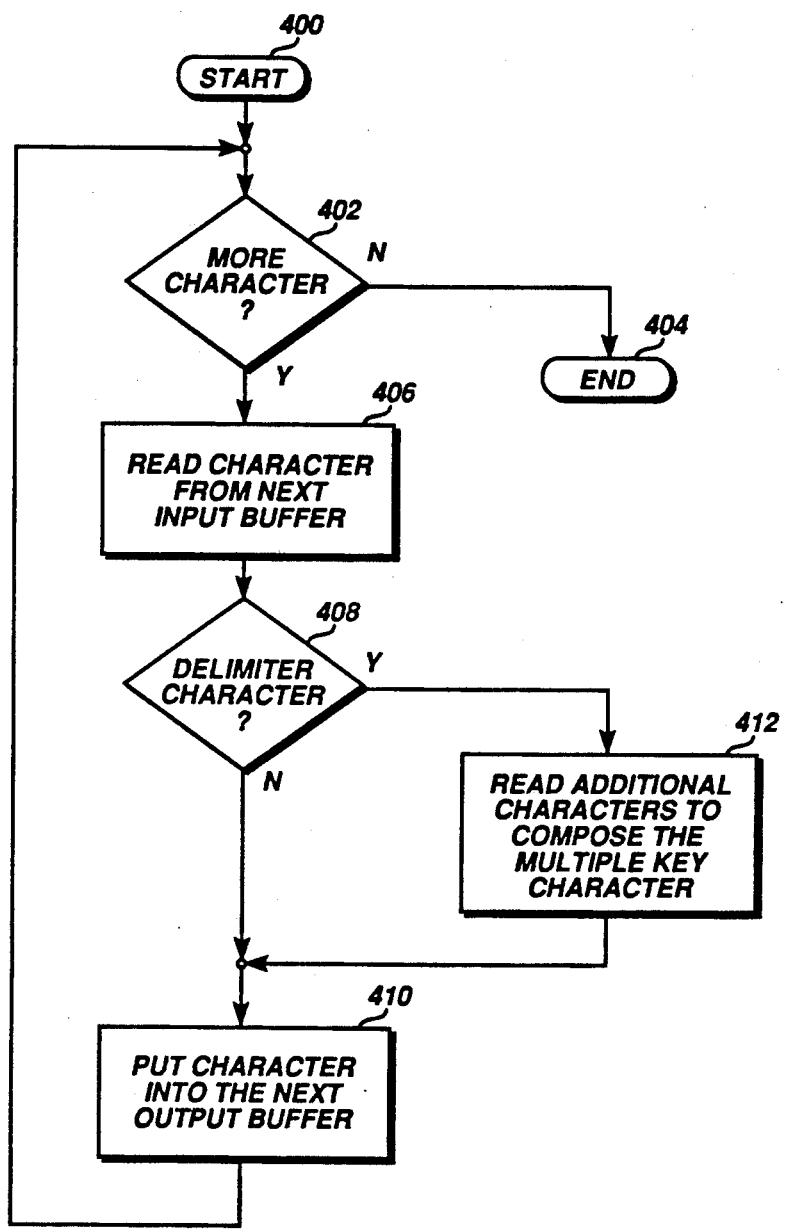
FIG. 5 is a flow chart illustrating the methodology of a specific example of buffer memory allocation for a multiple key character entry system.
Figure 6:
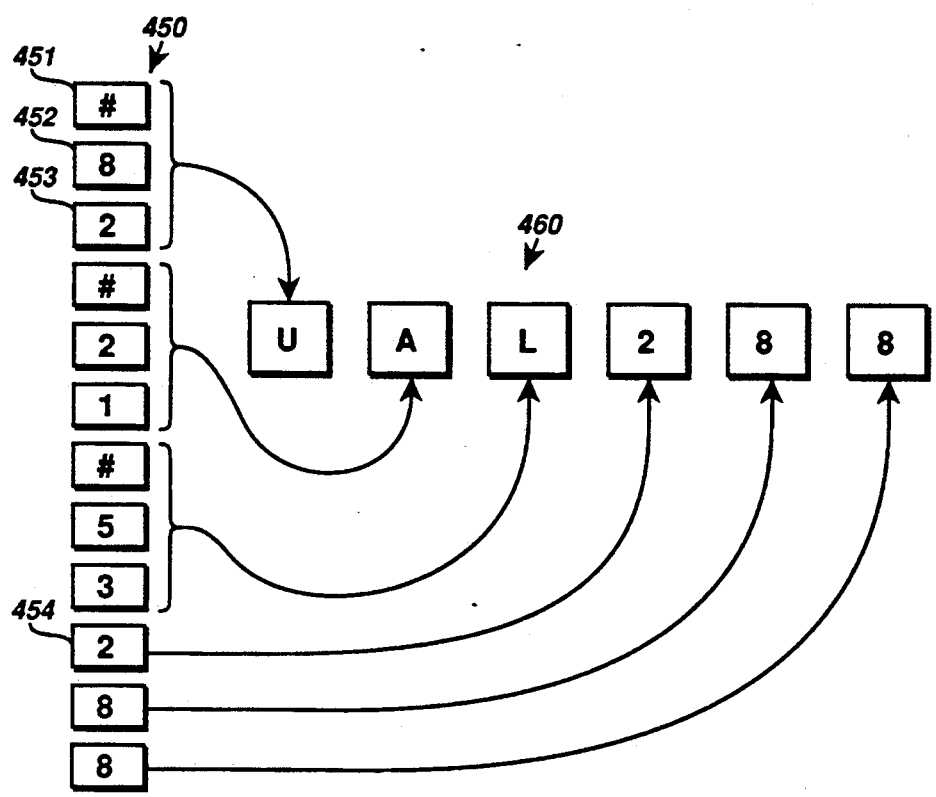
FIG. 6 is a diagrammatic illustration of a specific embodiment of a buffer memory structure for a multiple key character entry system.

FIG. 5 is a flow chart illustrating the methodology of a specific example of buffer memory allocation for a multiple key character entry system in which a leading delimiter with two following characters is used. FIG. 6 illustrates a specific embodiment of an input and output buffer structure suitable for the method of FIG. 5, including input buffers 450 and output buffers 460. These buffers are a series of memory locations which, for example, can be a single block of memory locations or a set of separate memory locations identified by a pointer.

The method starts at block 400 with the entry of characters into the input buffer 450 and the process then determines in step 402 if there are any more characters entered. If not, the process is encoded as illustrated by block 404. If more characters are entered, the next character is read from the input buffer 450 at step 406. The character read from the input buffer 450 is then checked to determine if it is the delimiter character, and if not, the character is put into the output buffer 460 at step 410. For example, see FIG. 6, input buffer 454. If the delimiter character is detected, the next two characters are read from the input buffer 450 and the resulting composed character is determined in step 412. The composed character is then put into the output buffer 460 in step 410. See FIG. 6, input buffers 451, 452 and 453. The process performed at step 412 depends upon the type of multi-key system use. Thus, a trailing delimiter system would require that previous key entries be read when the delimiter was detected, and a middle delimiter system would require reading the previous and next character to determine the proper character. After step 410, the process branches back to step 402 and repeats if there are any more characters.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the true spirit and scope of the basic underlying principles disclosed and claimed herein.

What is claimed is:

1. A method for providing secure access to a limited access system comprising the steps of:
   maintaining a plurality of user selectable ciphering algorithms that are accessible by an authorization means;
   selecting, by the user, one of the plurality of user selectable ciphering algorithms as an access ciphering method;
   inputting, by the user, a non-machine generated access code based on the selected ciphering algorithm and further comprised of at least a dynamic variable as a first cipher key;
   generating, for use by the authorization means, a corresponding access code also based on the selected ciphering algorithm and further comprised of at least a dynamic variable as a first cipher key;
   comparing the non-machine generated access code with the corresponding access code; and
   granting the user access to the limited access system in response to an output resulting from the comparison of the non-machine generated access code and the corresponding access code.

2. The method of claim 1 wherein the selectable ciphering algorithms are selectable by a plurality of users.

3. The method of claim 1 wherein the dynamic variable comprises location data regarding a current access position of the user.

4. The method of claim 1 wherein inputting by the user further comprises:
   entering a combination of at least one key from a keypad with numerical keys;
   entering another key from the keypad as a delimiter key; and
   determining whether the combination of the at least two numerical keys and the delimiter key represents a non-numerical character.

5. The method of claim 1 wherein the dynamic variable is an environmental dependent variable.

6. The method of claim 1 wherein the non-machine generated access code and corresponding access code futher comprise at least one fixed variable as a second cipher key.

7. An apparatus for providing secure access to a limited access system comprising:
  a. authorization means further comprising:
    (i) means for storing a plurality of user selectable ciphering algorithms;
    (ii) computing means, operably coupled to the means for storing, for generating a corresponding access code based on a user selected ciphering algorithm chosen from the plurality of user selectable ciphering algorithm;
    the corresponding access code further comprising at least one dynamic variable as a first cipher key;
    (iii) means, operably coupled to the computing means, for comparing a non-machine generated access code with the corresponding access code; and
    (iv) means, operably coupled to the computing means, for granting the user access to the limited access system in response to an output resulting from the comparison of the non-machine generated access code and the corresponding access code; and
  b. code entry means, operably coupled to the authorization means, for inputting a non-machine generated access code based on the selected ciphering algorithm;
  the non-machine access code further comprising at least one dynamic variable as a first cipher key.

8. The apparatus of claim 7 wherein the code entry means further comprises:
  means for selecting one of the plurality of user selectable ciphering algorithms as an access ciphering method.

9. The apparatus of claim 7 wherein the code entry means comprises a keypad having numerical keys.

10. The apparatus of claim 9 wherein the code entry means comprises:
  means for entering a combination of at least one key and a delimiter key from the keypad; and
  means, operably coupled to the means for entering, for determining whether the combination of at least one key and the delimiter key represents a non-numerical character.

11. The apparatus of claim 7 wherein the dynamic variable is an environmental dependent variable.

12. The apparatus of claim 7 wherein the non-machine access code and the corresponding access code further comprise at least one fixed variable as a second cipher key.

* * * * *